(12) United States Patent
Sun et al.

(10) Patent No.: US 11,967,136 B2
(45) Date of Patent: Apr. 23, 2024

(54) LANDMARK DETECTION USING MACHINE LEARNING TECHNIQUES

(71) Applicant: Shanghai United Imaging Intelligence Co., Ltd., Shanghai (CN)

(72) Inventors: Shanhui Sun, Lexington, MA (US); Yikang Liu, Cambridge, MA (US); Xiao Chen, Cambridge, MA (US); Zhang Chen, Brookline, MA (US); Terrence Chen, Lexington, MA (US)

(73) Assignee: Shanghai United Imaging Intelligence Co., Ltd., Shanghai (CN)

( * ) Notice: Subject to any disclaimer, the term of this patent is extended or adjusted under 35 U.S.C. 154(b) by 370 days.

(21) Appl. No.: 17/557,984

(22) Filed: Dec. 21, 2021

(65) Prior Publication Data

US 2023/0196742 A1   Jun. 22, 2023

(51) Int. Cl.
 *G06V 10/774* (2022.01)
 *G06T 7/00* (2017.01)
 *G06V 10/82* (2022.01)

(52) U.S. Cl.
 CPC ........ *G06V 10/7747* (2022.01); *G06T 7/0012* (2013.01); *G06V 10/82* (2022.01); *G06T 2207/30004* (2013.01)

(58) Field of Classification Search
 CPC .. G06V 10/7747; G06V 10/82; G06V 10/454; G06V 2201/03; G06T 7/0012; G06T 2207/30004; G06T 2207/20081; G06T 2207/20084; G06T 7/73
 See application file for complete search history.

(56) References Cited

U.S. PATENT DOCUMENTS

| 8,989,463 | B2 | 3/2015 | Barbot et al. |
| 9,521,988 | B2 | 12/2016 | Zhang et al. |
| 9,904,852 | B2 | 2/2018 | Divakaran et al. |
| 2021/0327074 | A1* | 10/2021 | Schwing ............... G06N 3/045 |
| 2022/0274625 | A1* | 9/2022 | Garimella ............. G06N 3/04 |
| 2022/0351863 | A1* | 11/2022 | Wang .................... G16H 30/40 |

FOREIGN PATENT DOCUMENTS

WO    2009044321 A2    4/2009

\* cited by examiner

*Primary Examiner* — Christopher M Brandt
(74) *Attorney, Agent, or Firm* — Zhong Law LLC

(57) ABSTRACT

Described herein are systems, methods, and instrumentalities associated with landmark detection. The detection may be accomplished by determining a graph representation of a plurality of hypothetical landmarks detected in one or more medical images. The graph representation may include nodes that represent the hypothetical landmarks and edges that represent the relationships between paired hypothetical landmarks. The graph representation may be processed using a graph neural network such a message passing graph neural network, by which the landmark detection problem may be converted and solved as a graph node labeling problem.

20 Claims, 7 Drawing Sheets

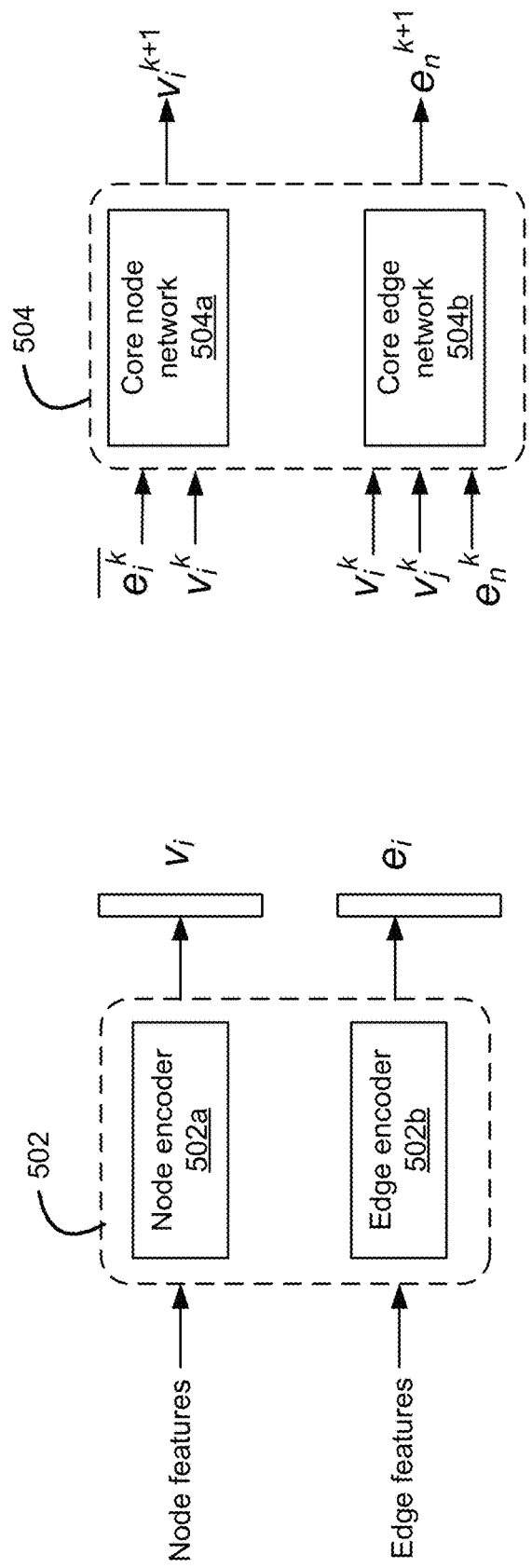
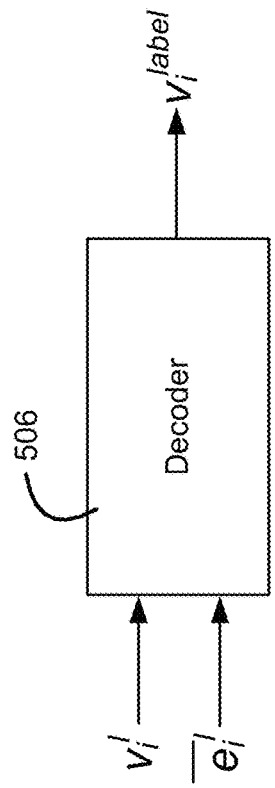
FIG. 5A
FIG. 5B
FIG. 5C

LANDMARK DETECTION USING MACHINE LEARNING TECHNIQUES

BACKGROUND

Landmark detection plays an important role in the medical imaging field. Having the ability to ascertain and/or monitor the locations of certain landmarks such as key anatomical structures, implanted medical devices, surgical devices, etc. based on scan images of a patient's body may be crucial to the success of many medical applications or procedures including, for example, motion estimation, surgical navigation, device alignment, etc. Conventional landmark detection techniques analyze these scan images independently from each other and lack the ability to determine and utilize the relationship that may exist between the landmarks, either in the same image frame or in different image frames. Consequently, the results produced by these conventional techniques are often inconsistent across different image frames and may include a large number of false positives. Model complexity and computational requirements may also be very high. Accordingly, systems, methods, instrumentalities are desired for improving the quality and efficiency of landmark detection.

SUMMARY

Described herein are systems, methods, and instrumentalities associated with landmark detection. An apparatus configured to perform the landmark detection task may include one or more processors configured to determine a plurality of hypothetical landmarks (e.g., a pair of balloon markers associated with a stent placed inside the anatomical structure, a guide wire placed inside the anatomical structure, etc.) in one or more medical images of an anatomical structure and determine a graph representation of the plurality of hypothetical landmarks. The graph representation may include multiple nodes and multiple edges, where each of the nodes may represent a hypothetical landmark among the plurality of hypothetical landmarks and each of the edges may represent a relationship between a pair of hypothetical landmarks among the plurality of hypothetical landmarks. The one or more processors of the apparatus may be further configured to identify, using a graph neural network (GNN), one or more hypothetical landmarks among the plurality of hypothetical landmarks as true landmarks and/or one or more hypothetical landmarks among the plurality of hypothetical landmarks as false landmarks. The GNN may be a message passing graph neural network and may include an encoder network, a core network, and a decoder network. The encoder network may be trained to extract respective features from the nodes of the graph representation and the edges of the graph representation, the core network may be trained to estimate respective states of the nodes and edges of the graph representation based on the features extracted by the encoder network, and the decoder network may be trained to indicate the true landmarks and/or the false landmarks based on the respective states of the nodes and edges estimated by the core network.

In examples, the core network described herein may include a first core sub-network trained to estate the respective states of the nodes of the graph representation and a second core sub-network trained to estate the respective states of the edges of the graph representation. In examples, the encoder network described herein may include a node encoder trained to extract the respective features of the nodes of the graph representation and an edge encoder trained to extract the respective features of the edges of the graph representation. In examples, the one or more processors of the apparatus being configured to determine the plurality of hypothetical landmarks in the one or more medical images of the anatomical structure may comprise the one or more processors being configured to extract features from the one or more medical images of the anatomical structure using a landmark detection neural network and determine respective locations of the plurality of hypothetical landmarks in the one or more medical images based on the features extracted by the landmark detection neural network.

In examples, the plurality of hypothetical landmarks described herein may include a first set of hypothetical landmarks detected in a first medical image of the anatomical structure and a second set of hypothetical landmarks detected in a second medical image of the anatomical structure. In these examples, the one or more processors of the apparatus being configured to determine the graph representation of the plurality of hypothetical landmarks may comprise the one or more processors being configured to represent the first set of hypothetical landmarks and the second set of hypothetical landmarks with the nodes of the graph representation, pair the first set of hypothetical landmarks with the second set of hypothetical marks, and represent the respective relationships between the paired hypothetical marks with the edges of the graph representation. In these examples, the features extracted by the encoder network for each of the edges of the graph representation may indicate a similarity or a dissimilarity between the paired hypothetical landmarks represented by the edge.

In examples, the plurality of hypothetical landmarks described herein may include hypothetical landmarks detected in a single medical image of the anatomical structure, wherein the one or more processors of the apparatus being configured to determine the graph representation of the plurality of hypothetical landmarks comprises the one or more processors being configured to represent the hypothetical landmarks detected in the single medical image with the nodes of the graph representation, pair a first subset of the hypothetical landmarks detected in the single medical image with a second subset of the hypothetical landmarks detected in the single medical image, and represent the respective relationships between the paired hypothetical marks in the single medical image with the edges of the graph representation. In these examples, the features extracted by the encoder network for each of the edges of the graph representation may indicate a geometric constraint between the paired hypothetical landmarks represented by the edge.

In examples, the core network described herein may be trained to estimate the respective states of the nodes and edges of the graph representation through an iterative process that may includes determining a current state of a node of the graph representation based on a previous state of the node and an average state of one or more edges of the graph representation that are associated with the node, and determining a current state of an edge of the graph representation based on a previous state of the edge and respective current states of one or more nodes of the graph representation that are associated with the edge.

BRIEF DESCRIPTION OF THE DRAWINGS

A more detailed understanding of the examples disclosed herein may be had from the following description, given by way of example in conjunction with the accompanying drawing.

FIG. 5A, FIG. 5B and FIG. 5C are simplified diagrams illustrating example techniques for encoding the features of graph nodes and graph edges and for determining the respective true/false statuses of hypothetical landmarks in accordance with one or more embodiments described herein.

DETAILED DESCRIPTION

The present disclosure is illustrated by way of example, and not by way of limitation, in the figures of the accompanying drawings.

Figure 1A:
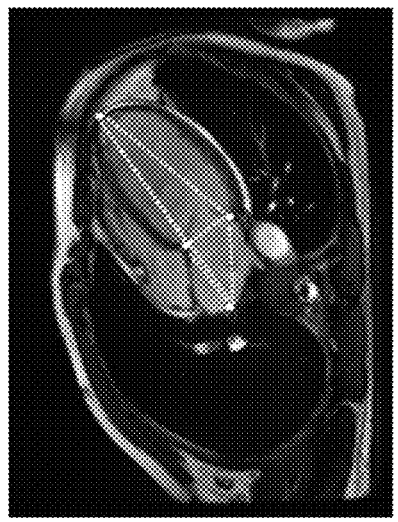
FIG. 1A, FIG. 1B and FIG. 1C are diagrams illustrating example landmarks that may be detected using the techniques provided in accordance with one or more embodiments describe herein.
Figure 1B:
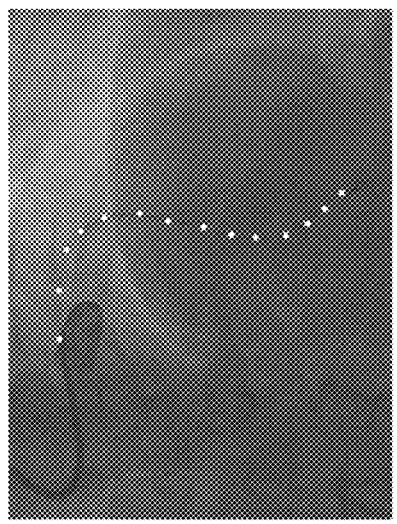
Figure 1C:
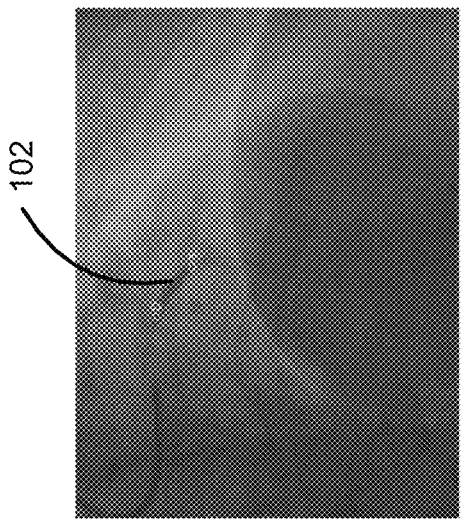

FIG. 1A, FIG. 1B and FIG. 1C illustrate example landmarks that may be detected using the techniques described herein. FIG. 1A shows example left ventricle myocardium and left atrium intersection points and apical points, FIG. 1B shows B-spline control points representing a guidewire, and FIG. 1C shows example paired balloon markers 102 associated with a stent placement. These landmarks may maintain the same spatial and/or geometric characteristics from one scan image to the next and/or the certain geometric relationships (e.g., constraints) within a same scan image. For example, the relative locations of the apical point and the two intersection points, the relative locations of the points along the guidewire, and/or the distance between the two balloon markers may remain the same in multiple scan images. As such, these spatial and/or geometric characteristics may be explored to improve the detection of the landmarks, for example, by identifying the landmarks that maintain the characteristics as true landmarks and those that do not maintain the characteristics as false landmarks.

Figure 2:
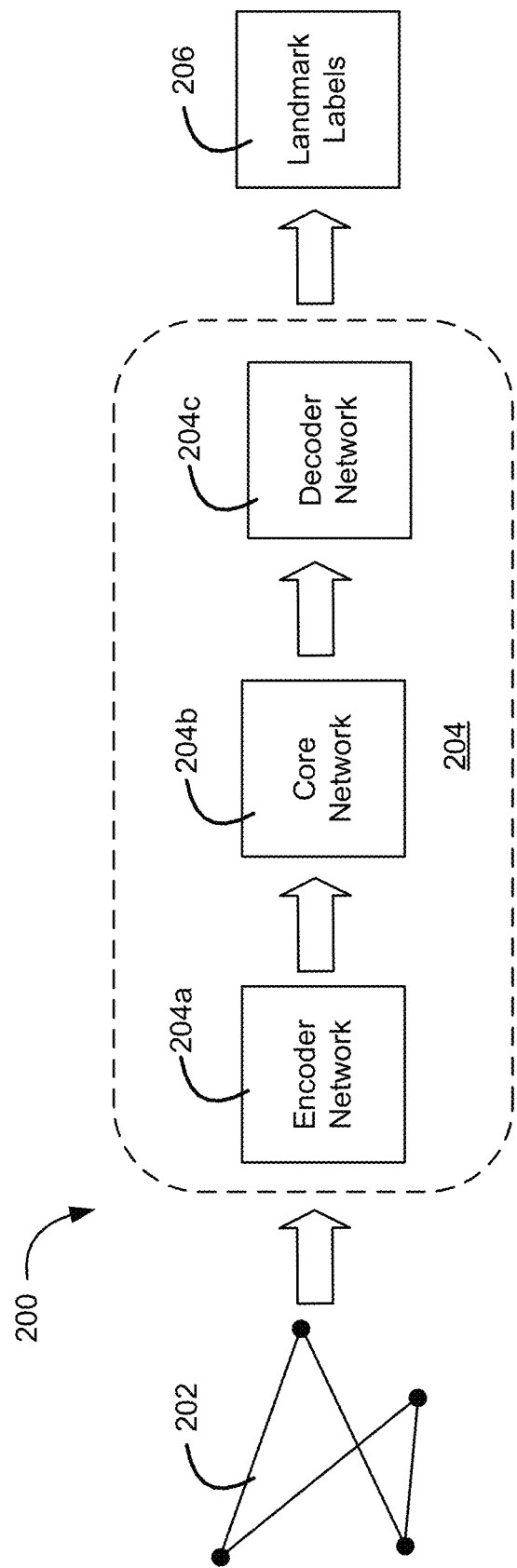
FIG. 2 is a simplified diagram illustrating an example landmark detection apparatus in accordance with one or more embodiments disclosed herein.

FIG. 2 is a simplified diagram illustrating an example landmark detection apparatus (LDA) 200 in accordance with one or more embodiments disclosed herein. As shown, LDA 200 may be configured to detect a plurality of landmarks in one or more medical images based on graph representation 202 of the landmarks. The one or more medical images may be scan images (e.g., MRI, X-ray, etc.) of an anatomical structure (e.g., a heart) of the human body, and the landmarks may include various anatomical and/or artificial structures or components such as the left ventricle myocardium and left atrium intersection points and/or apical points shown in FIG. 1A, the guidewire shown in FIG. 1B, the pair of balloon markers of a stent shown in FIG. 1C, etc. The landmarks may belong to the same scan image (e.g., a single image frame) or different scan images (e.g., multiple scan images of a cardiac cine movie). The landmarks may be initially identified by LDA 200 on a hypothetical basis. For example, LDA 200 may be configured to extract features from the one or more medical images (e.g., using a landmark detection neural network described herein) and identify a plurality of hypothetical landmarks (e.g., respective locations of the hypothetical landmarks) in the one or more medical images based on the extracted features. Because of the similarity in the landmarks and their surrounding areas in the medical images, the hypothetical landmarks identified by LDA 200 may include true positives (e.g., true landmarks) and/or false positives (e.g., background areas mistakenly identified as the landmarks). LDA 200 may be configured to represent the hypothetical landmarks and/or their inter-relationships with graph representation 220 and process the graph representation through graph neural network (GNN) 204 (e.g., a message passing graph neural network) to determine the true landmarks and/or false landmarks among the plurality of hypothetical landmarks. Upon making the determination, LDA 200 may indicate (e.g., label) the true/false statuses of the landmarks, for example, via landmark labels 206 (e.g., with true/false labels).

Graph representation 202 may include multiple nodes and multiple edges. Each of the nodes may represent a hypothetical landmark among the plurality of hypothetical landmarks determined by LDA 200, and each of the edges may represent a relationship between a pair of hypothetical landmarks among the plurality of hypothetical landmarks determined by LDA 200. An edge may represent, for example, a relationship between a hypothetical landmark (e.g., a patch that hypothetically comprises a pair of corresponding balloon markers) in a first scan image and a hypothetical landmark (e.g., a patch that hypothetically comprises the same pair of corresponding balloon markers) in a second scan image. An edge may also represent, for example, a relationship between two hypothetical landmarks in the same scan image (e.g., between a first patch that hypothetically comprises a pair of corresponding balloon markers and a second patch that hypothetically comprises a guidewire). As will be described in greater detail below, by representing the geometric and/or spatial characteristics of the landmarks within the same scan image or across different scan images with the nodes and edges of graph representation 202, the problem of landmark detection may be converted into a problem of graph node labeling and solved using GNN 204.

As shown in FIG. 2, GNN 204 may include an encoder network 204a, a core network 204b, and/or a decoder network 204c. Encoder network 204a may be trained to receive graph representation 202 and extract respective features from the nodes of the graph representation and the edges of the graph representation. Core network 204b may be trained to estimate respective states (e.g., current features) of the nodes and edges of graph representation 202 based on the features extracted by encoder network 204a, while decoder network 204c may be trained to indicate (e.g., with landmark labels 206) true landmarks and/or false landmarks among the plurality of hypothetical landmarks originally determined by LDA 200 based on the respective states of the nodes and edges of graph representation 202 estimated by core network 204b.

Figure 3:
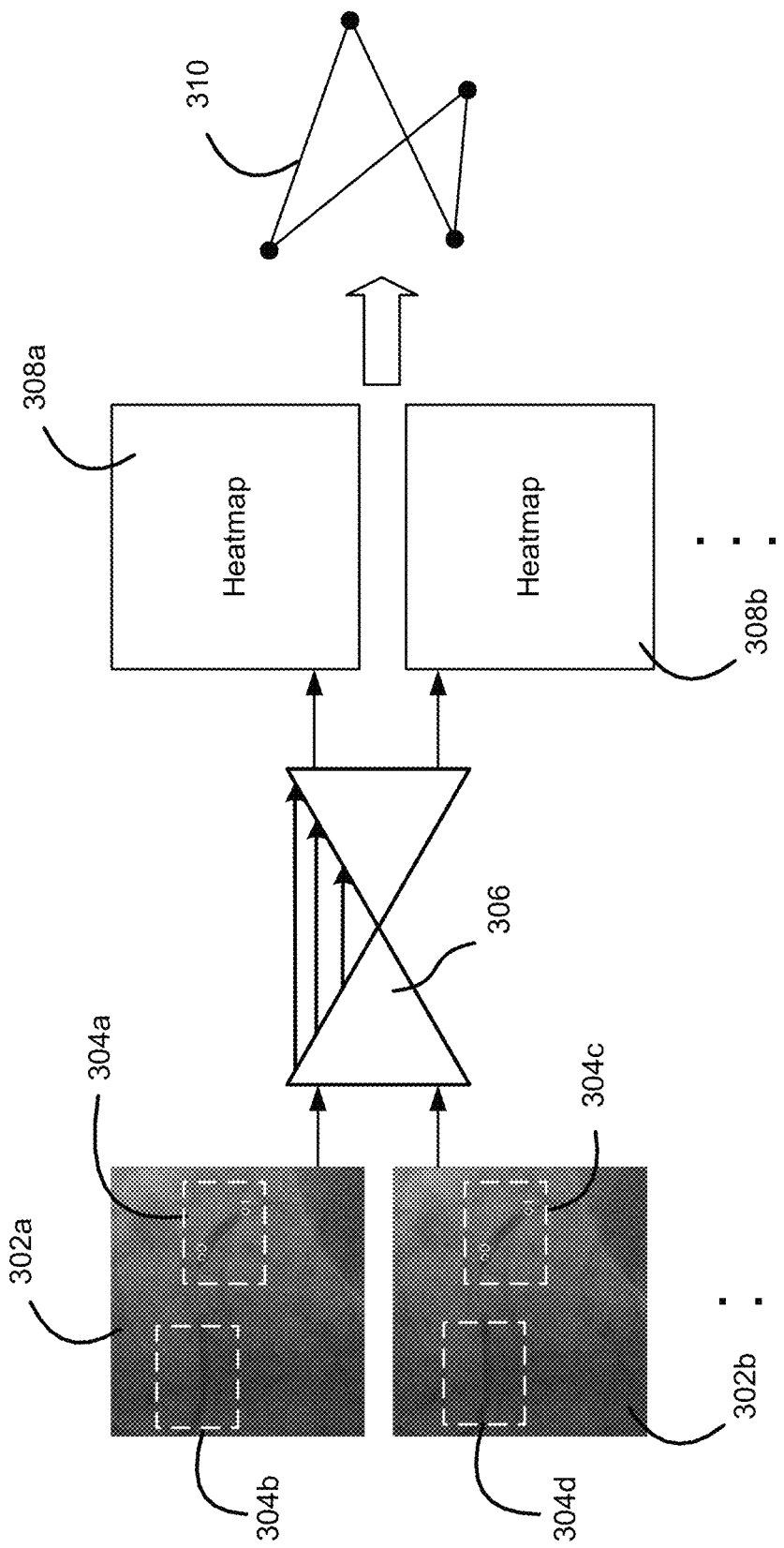
FIG. 3 is a simplified diagram illustrating example operations that may be performed for determining a graph representation of a plurality of hypothetical landmarks in accordance with one or more embodiments described herein.

FIG. 3 illustrates example operations that may be associated with determining a graph representation (e.g., graph representation 202 of FIG. 2) of a plurality of hypothetical landmarks in one or more medical images of an anatomical structure. The examples will be described in the context of balloon marker detection, but those skilled in the art will appreciate that the same or similar techniques may be used to detect other landmarks as well. As shown in FIG. 3, the plurality of hypothetical landmarks may be associated with one or more medical scan images (e.g., 302a, 302b, etc.) and may include corresponding objects of interest detected in the one or more medical scan images. For example, the plurality of hypothetical landmarks may include first balloon marker pair 304a (e.g., which may be a true balloon marker pair), second balloon marker pair 304b (e.g., which may be a false balloon marker pair erroneously detected due to its similarity to balloon marker pair 304a), third balloon marker pair 304c (e.g., which may be another true balloon marker pair), and fourth balloon marker pair 304d (e.g., which may be another false balloon marker pair erroneously detected due to its similarity to balloon marker pair 304c).

The plurality of hypothetical landmarks may be detected using a landmark detection neural network (LDNN) such as LDNN 306 that may be trained to extract features from the medical scan images described herein (e.g., 302a, 302b, etc.) and predict (e.g., hypothesize) the respective locations of the landmarks in the medical scan images. LDNN 306 may include, for example, a fully convolutional neural network (CNN) having an encoder-decoder structure (e.g., a U-Net structure). The CNN may include multiple convolutional layers and/or one or more pooling layers. The convolutional layers may be followed by batch normalization and/or linear or non-linear activation (e.g., such as rectified linear unit or ReLU activation). Each of the convolutional layers may include a plurality of convolution kernels or filters with respective weights, the values of which may be learned through a training process so as to extract features from medical scan images 302a, 302b, etc. The features extracted by the convolutional layers may be down-sampled through one or more pooling layers to obtain a representation of the features, for example, in the form of one or more feature maps. The CNN (e.g., LDNN 306) may further include one or more un-pooling layers and one or more transposed convolutional layers. Through the un-pooling layers, the CNN may up-sample the features extracted from the input medical scan images and further process the up-sampled features through the one or more transposed convolutional layers (e.g., via a plurality of deconvolution operations) to derive one or more up-scaled or dense feature maps. The dense feature maps may then be used to predict (e.g., hypothesize) the locations of landmarks 304a-304d, for example, in respective heatmaps or Gaussian response maps (e.g., 308a, 308b, etc.) corresponding to the input medical scan images (302a, 302b, etc.), where the centers of the Gaussian (e.g., with predefined sigma) may indicate the respective predicted (e.g., hypothetical) locations of the landmarks.

LDNN 306 may be trained to perform the functions described above using annotated landmark data. The training process will be described in greater detail below, for example, with reference to FIG. 6. And once the hypothetical landmarks (e.g., 304a-304d) are determined, a graph representation 310 (e.g., a data structure representing a graph) comprising nodes and edges may be created to capture information about the hypothetical landmarks and their inter-relationships. Each node of graph representation 310 may correspond to a data structure configured to store information about one of the hypothetical landmarks and each edge of graph representation 310 may correspond to a data structure configured to store information about the relationship between two hypothetical landmarks. For example, in the example in shown in FIG. 3, the nodes of graph representation 310 may correspond to data structures storing information about hypothetical landmarks 304a, 304b, 304c and 304d, respectively, and the edges of graph representation 310 may correspond to data structures storing information about the respective relationships between landmarks 304a and 304c, between landmarks 304a and 304d, between landmarks 304b and 304c, and between landmark 304b and 304d, respectively.

The nodes and edges of graph representation 310 may have their own features. By extracting and tracking these features, true landmarks such as landmarks 304a and 304c may be distinguished from false landmarks such as landmarks 304b and 304d using a GNN described herein (e.g., GNN 204 of FIG. 2). The features of each node in graph representation 310 may be multi-dimensional. For example, the features of a node corresponding to a hypothetical pair of balloon markers (e.g., landmark 304a, 304b, 304c, or 304d) may be represented by heatmap values surrounding (e.g., in the vicinity of) the two marker locations. These features may be extracted using a pre-trained neural network such as one having an encoder-decoder structure, e.g., similar to neural network 306. In examples, such an encoder-decoder neural network may be trained to encode an entire patch of imagery data that contains the pair of balloon markers represented by a node and the features extracted by the encoder of the neural network may be used as the features of the node.

The features of each edge in graph representation 310 may be derived based on geometric constraints associated with the two nodes connected by the edge. Using the edge connecting landmark 304a and landmark 304c as an example, the distance between the two hypothetical balloon markers of landmark 304a may be similar to the distance between the two hypothetical balloon markers of landmark 304c since both landmarks 304a and 304c are true landmarks and, as described above, the geometric characteristics of these true landmarks may be sustained between image frames. In contrast, the distance between the two hypothetical balloon markers of landmark 304a may be different from the distance between the two hypothetical balloon markers of landmark 304d since landmark 304d is a false landmark and therefore may possess the same geometric characteristics as landmark 304a. Accordingly, the similarity or dissimilarity (e.g., a similarity score or dissimilarity score) between the pair of nodes connected by each edge (e.g., between respective patches of the medical scan images that contain the two landmark nodes) may be used as the features of the edge.

Figure 4B:
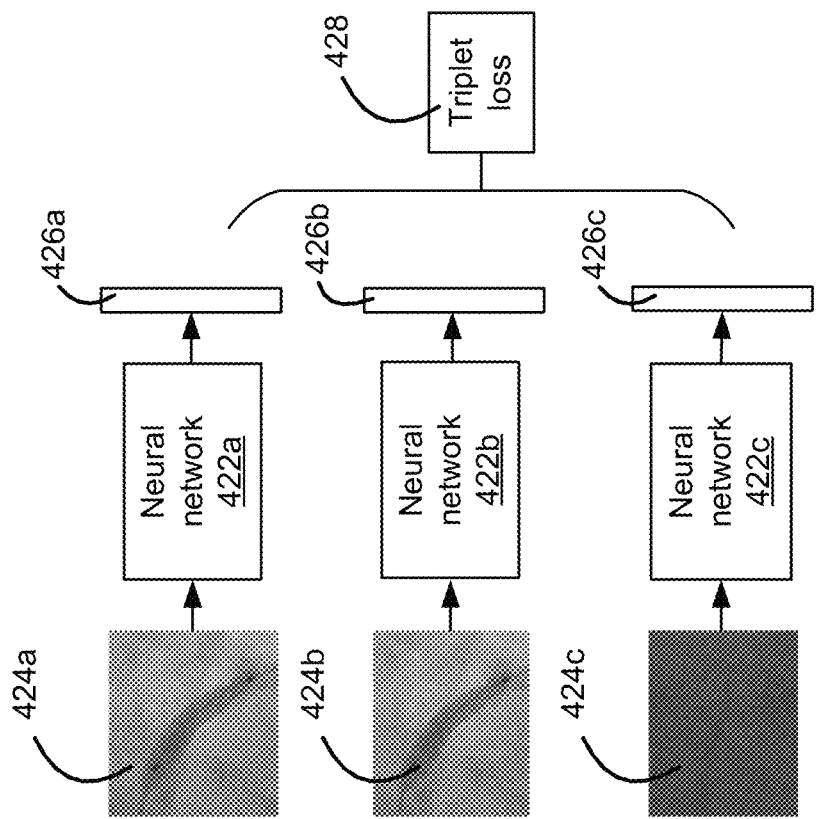
FIG. 4A and FIG. 4B are simplified diagram illustrating example neural network structures and techniques for determining the features of a graph edge in accordance with one or more embodiments described herein.
Figure 4A:
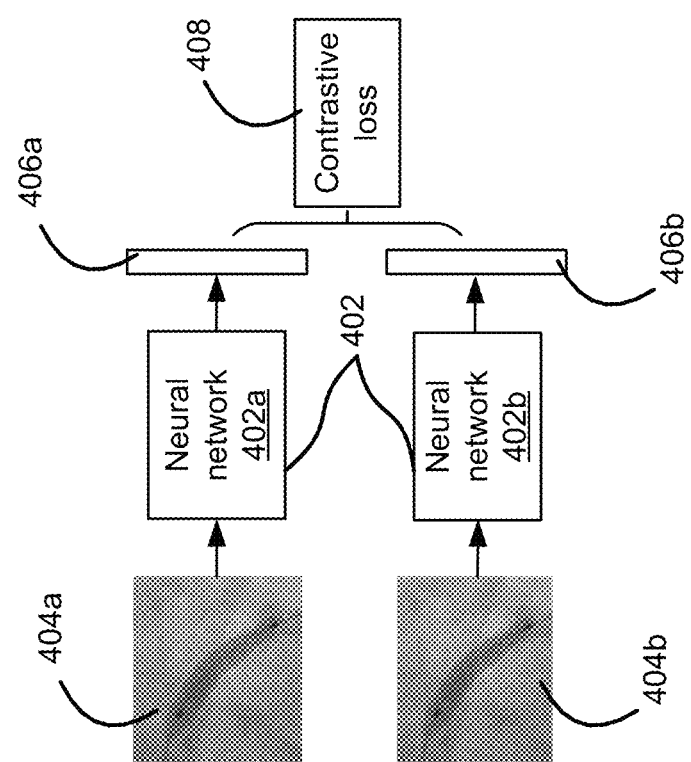

FIGS. 4A and 4B illustrate example neural network structures and techniques for determining edge features. FIG. 4A illustrates an example that utilizes a Siamese network structure and a contrastive loss to determine the similarity (e.g., a similarity score) between two graph nodes as the features of the graph edge that connects the two graph nodes. As shown, the similarity may be determined using Siamese network 402 by comparing the features of two patches of imagery data 404a and 404b that contain the respective hypothetical landmarks (e.g., respective pairs of balloon markers) represented by the graph nodes. Siamese network 402 may include twin subnetworks 402a and 402b sharing the same (e.g., substantially similar) weights and trained to process patches 404a and 404b in tandem. It should be noted that although Siamese network 402 may be shown in the figures provided herein as having two subnetworks, some implementations may use a same network twice (e.g., before backpropagation) to perform the same functions.

Subnetworks 402a and 402b may include respective CNNs (e.g., fully connected CNNs) each having multiple convolutional layers, one or more pooling layers, and/or one or more fully connected layers. The convolutional layers of the CNN may include a plurality of convolution kernels or filters configured to extract features from patches 404a and 404b through one or more convolution operations. The convolution operations may be followed by batch normalization and/or non-linear activation, and the features extracted by the convolutional layers may be down-sampled through the one or more pooling layers to reduce the redundancy and/or dimension of the features. As a result of the convolution and/or down-sampling operations, respective feature representations (e.g., latent space representations) of patches 404a and 404b may be obtained, for example, in the form of twin feature vectors 406a and 406b. The feature vectors may then be compared (e.g., at a patch level and/or via a correlation layer) to determine the similarity between patches 404a and 404b. The similarity may be represented in a similarity score map (e.g., or other suitable similarity metrics such as a similarity vector, a similarity score, etc.) and may be used as the features of the graph edge connecting the respective graph nodes corresponding to patch 404a and patch 404b.

Siamese network 402 may be trained through contrastive learning, for example, based on contrastive loss 408. Such a contrastive loss may be determining, for example, based on the cosine distance or Euclidean distance of feature vectors 406a and 406b, and the training of Siamese network 402 may be conducted with an objective of keeping the loss low if patches 404a and 404b are similar (e.g., having a closer distance) and keeping the loss high if patches 404a and 404b are different (e.g., having a larger distance).

FIG. 4B illustrates an example that utilizes a Siamese network structure and a triplet loss to determine the similarity (e.g., a similarity score) between two graph nodes. As shown, the similarity may be determined using a Siamese network (e.g., comprising subnetworks 422a, 422b and 422c) that may have a similar structure as Siamese network 402 of FIG. 4A (e.g., except that the number of identical subnetworks or the number of times a same network is used is three instead of two). Also similar to the example shown in FIG. 4A, the similarity between the two graph nodes may be determined based on patches 424a and 424b that contain the respective hypothetical landmarks (e.g., respective pairs of balloon markers) represented by the graph nodes. More specifically, the similarity between the two graph nodes may be determined based at least on feature vectors 426a and 426b respectively associated with patches 424a and 424b, and the similarity may be represented in a similarity score map (e.g., or other suitable similarity metrics) and used as the features of the graph edge connecting the respective graph nodes corresponding to patch 424a and patch 424b.

The Siamese network shown in FIG. 4B may be trained using triplet loss 428, for example, by additionally utilizing negative patch 424c together with patches 424a and 424b, which may represent anchor and positive patches, respectively. With negative patch 424c and triplet loss 428, the training of the Siamese network may be conducted with an objective to minimize or reduce the distance (e.g., cosine distance or Euclidean distance) between anchor patch 424a and positive patch 424b (e.g., between feature vectors 426a and 426b) while maximizing or increasing the distance between anchor patch 424a and negative patch 424c (e.g., between feature vectors 426a and 426c).

FIGS. 5A-5C illustrate example techniques for encoding the features of graph nodes (e.g., representing hypothetical landmarks) and graph edges (e.g., representing inter-relationships of the hypothetical landmarks) that may be established using the techniques described herein, and determining the respective true/false statuses of the hypothetical landmarks (e.g., by labeling the corresponding graph nodes) using a graphical neural network (GNN) (e.g., a message passing GNN). FIG. 5A illustrates that the GNN may include an encoder network 502 trained to encode the respective features of a graph node and a graph edge, which may be obtained using the techniques describe above. In examples, the GNN may include node encoder 502a trained to encode the node features and represent the encoded node features with a node feature vector, $v_i$ (e.g., corresponding to graph node i). The GNN may further include edge encoder 502b trained to encode the edge features and represent the encoded edge features with an edge feature vector, e (e.g., corresponding to graph edge i). In examples, node encoder 502a and edge encoder 502b may include respective multi-layer perceptron (MLP) neural networks (e.g., fully connected neural networks). Each MLP neural network may include an input layer, an output layer, and one or more hidden layers comprising of respective linearly or non-linearly-activating nodes (e.g., perceptrons) that may be trained to encode the input features into a feature representation (e.g., feature vector $v_i$ or $e_i$), which may then be used by the GNN to determine the state (e.g., status) of a node or edge based on other node(s) or edge(s).

FIG. 5B illustrates that the graphical neural network (GNN) described herein may include a core network 504 trained to determine (e.g., update) the respective states (e.g., current features) of each graph node and graph edge of a graph representation (e.g., graph representation 202 of FIG. 2 or graph representation 310 of FIG. 3) based on other node(s) and/or edge(s) of the same graph representation. The GNN may be trained to update the respective states of each graph node and each graph edge through an iterative process (e.g., through multiple iterations k, k+1, k+2, . . . , etc.). For example, core network 504 may include a first core sub-network (e.g., node network 504a) trained to determine the state, $v_i^{k+1}$, of a current graph node i (e.g., in iteration k+1) based on a previous state, $V_i^k$, of the current graph node (e.g., in iteration k) and an average edge state, $\overline{e_i^k}$, of the edge(s) (e.g., the edge preceding the node and the edge succeeding the node, if available) associated with the current graph node at iteration k. Core network 504 may also include a second core sub-network (e.g., edge network 504b) trained to determine the state, $e_n^{k+1}$ of a current edge n (e.g., in iteration k+1) based on a previous state, $e_n^k$, of the current edge (e.g., in iteration k) and the respective states, $v_i^k$ and $v_j^k$, of graph nodes i and j (e.g., during iteration k) connected by the current edge. Each of core node network 504a and core edge network 504b may be implemented as a recurrent neural network (e.g., RNN) or an iterative neural network (e.g., a cascade network with a fixed number of iterations) that may be trained to track the previous states (e.g., hidden states) of the nodes and edges described herein, and determine respective final states of the nodes and edges based on the hidden states. The initial state of the graph nodes may be set based on (e.g., to be same as) the outputs of node feature encoder 502a while the initial state of the graph edges may be set based on (e.g., to be same as) the outputs of edge feature encoder 502b.

FIG. 5C illustrates that the graphical neural network (GNN) described herein may include a decoder network 506 trained to determine (e.g., label) the true/false statuses of graph nodes based on respective final states of the graph nodes and graph edges. A graph node may be labeled as true to indicate that the hypothetical landmark represented by the graph node is a true landmark (e.g., a true pair balloon markers such as landmark 304a or 304c of FIG. 3) and a graph node may be labeled as false to indicate that the hypothetical landmark represented by the graph node is a false landmark (e.g., an artifact such as landmark 304b or 304d of FIG. 3 that merely resembles a pair of balloon markers). The respective final states $v_i^l$ of the graph nodes may correspond to the respective final features of the graph nodes determined by node encoder 502a and core node network 504a, and the respective final states $\overline{e_i^l}$ of the graph edges may correspond to the respective final features of the graph edges determined by edge encoder 502b and core edge network 504b. As described herein, the respective final features of the graph nodes may indicate characteristics of the imagery data in the vicinity of the hypothetical landmark represented by the graph node and the respective final features of the graph edges may indicate the similarity of the graph nodes connected by each graph edge. As such, decoder network 506 (e.g., a fully connected neural network comprising one or more fully-connected layers) may be trained to label a graph node (e.g., the corresponding hypothetical landmark) as true on a condition that the graph node possesses certain features and that the similarity of the graph node with its neighboring graph nodes meets certain criteria (e.g., a similarity score is above a predetermined threshold value). Conversely, decoder network 506 may be trained to label a graph node (e.g., the corresponding hypothetical landmark) as false on a condition that the graph node does not possesses certain features and that the similarity of the graph node with its neighboring graph nodes does not meet certain criteria (e.g., a similarity score is below a predetermined threshold value).

It should be noted that even though certain structures are described for the neural networks described herein, the neural networks are not limited to the described structures. Additionally, the proposed techniques may be applied to detecting landmarks in multiple sequential scan images or in a single scan image, where the scan images may be two-dimensional (2D) or three-dimensional (3D). For example, the proposed techniques may be applied to detecting multiple landmarks in a single image frame. For each landmark (e.g., a, b, c, etc.), multiple hypothetical locations may be determined (e.g., a0, a1, a2, . . . b0, b1, b2, . . . c0, c1, c2, . . . etc.). Each hypothetical landmark may be represented as a graph node in a graph representation and the relationship between a pair of hypothetical landmarks may be represented as an edge in the graph representation. Respective features of the hypothetical nodes and edges may be determined and/or encoded, where the features of each hypothetical node may represent characteristics of the image area containing the hypothetical landmark and the features of each edge may represent the geometric constraint(s) associated with the hypothetical landmarks connected by the edge. In this way, true/false landmarks may be determined in the single image by converting the landmark detection problem into a graph node labeling problem, which may then be solved using a message passing graph neural network as described herein.

Figure 6:
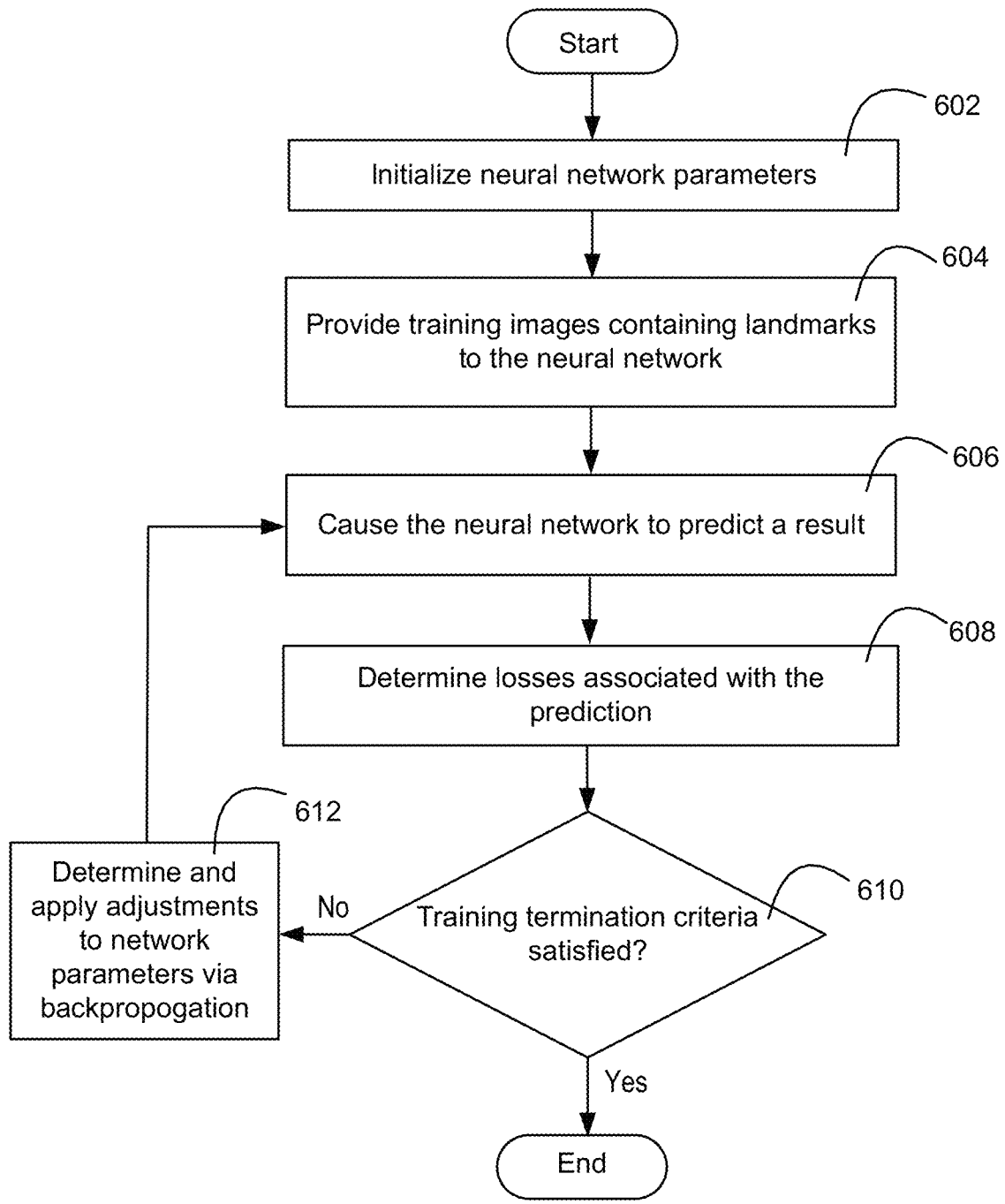
FIG. 6 is a simplified flow diagram illustrating example operations that may be performed for training a neural network in accordance with one or more embodiments described herein.

FIG. 6 illustrates example operations that may be associated with training a neural network described herein (e.g., the various encoder networks, core networks, and/or decoder networks) to perform the landmark detection tasks described herein. As shown, the training operations may include initializing the parameters of the neural network (e.g., weights associated with the various filters or kernels of the neural network) at 602. The parameters may be initialized, for example, based on samples collected from one or another probability distributions or parameter values of another neural network having a similar architecture. The training operations may further include providing training data (e.g., medical scan images comprising landmarks to be detected) to the neural network at 604, and causing the neural network to predict a result at 606. Depending on the functions that the neural network is designed to perform, the predicted result may be, for example, a set of image features associated with a landmark or a graph node, a set of features of a graph edge representing a relationship (e.g., spatial relationship or geometric constraint) between two graph nodes, the final state of a graph node or a graph edge, a true/false label of a hypothetical landmark, etc. At 608, the predicted result may be compared with a ground truth to determine a loss associated with the prediction. The loss may be determined using a suitable loss function such as, e.g., mean squared errors (MSE), L1 norm, L2 norm, etc. Once determined, the loss may be evaluated at 610 to determine whether one or more training termination criteria have been satisfied. For example, a training termination criterion may be deemed satisfied if the loss(es) described above is below a predetermined thresholds, if a change in the loss(es) between two training iterations (e.g., between consecutive training iterations) falls below a predetermined threshold, etc. If the determination at 610 is that a training termination criterion has been satisfied, the training may end. Otherwise, the loss may be backpropagated (e.g., based on a gradient descent associated with the loss) through the neural network at 612 before the training returns to 606.

For simplicity of explanation, the training steps are depicted and described herein with a specific order. It should be appreciated, however, that the training operations may occur in various orders, concurrently, and/or with other operations not presented or described herein. Furthermore, it should be noted that not all operations that may be included in the training process are depicted and described herein, and not all illustrated operations are required to be performed.

Figure 7:
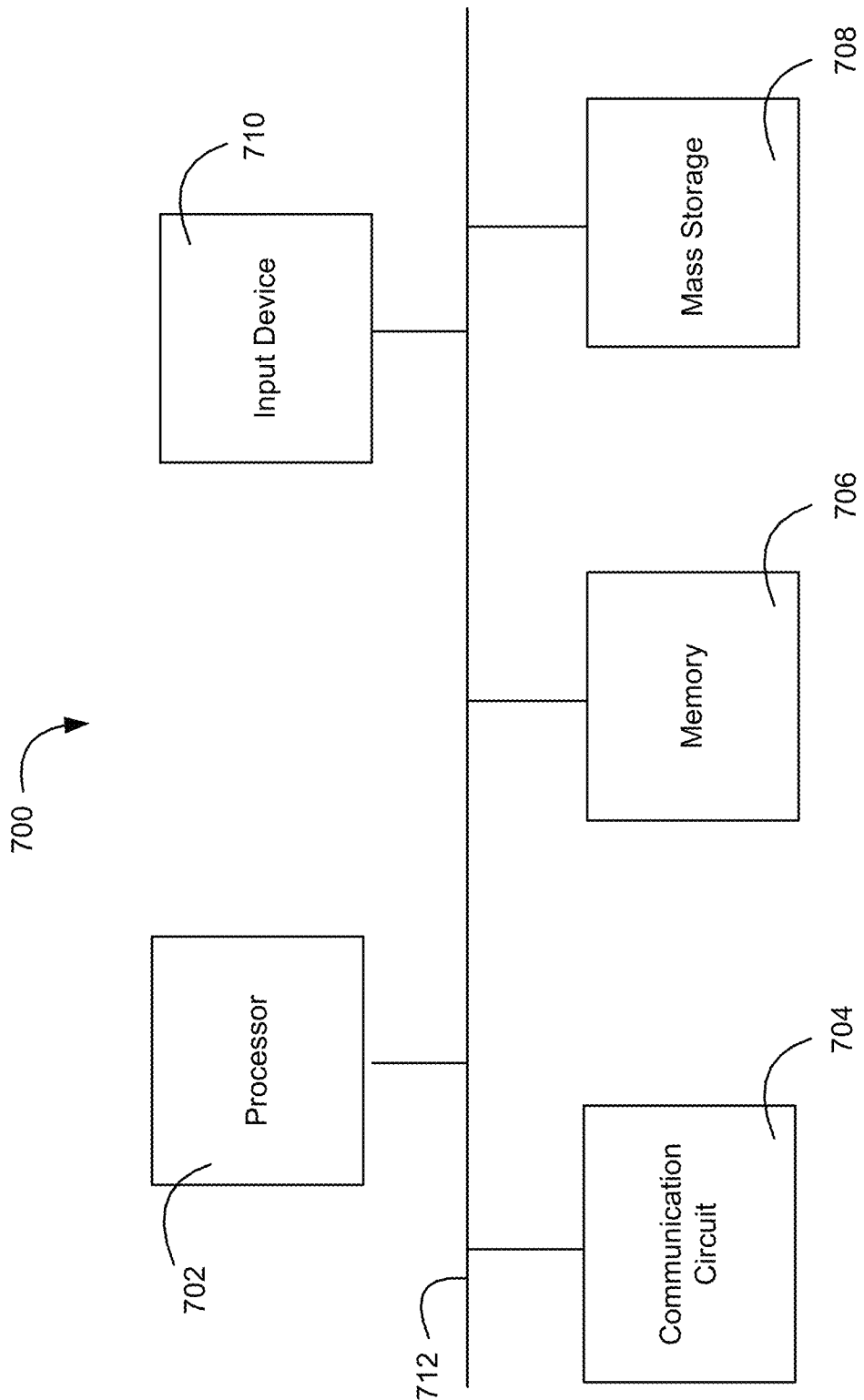
FIG. 7 is a simplified block diagram illustrating example components of an apparatus that may be configured to perform the landmark detection tasks in accordance with one or more embodiments described herein.

The systems, methods, and/or instrumentalities described herein may be implemented using one or more processors, one or more storage devices, and/or other suitable accessory devices such as display devices, communication devices, input/output devices, etc. FIG. 7 is a block diagram illustrating an example apparatus 700 that may be configured to perform the landmark detection tasks described herein. As shown, the apparatus 700 may include a processor (e.g., one or more processors) 702, which may be a central processing unit (CPU), a graphics processing unit (GPU), a microcontroller, a reduced instruction set computer (RISC) processor, application specific integrated circuits (ASICs), an application-specific instruction-set processor (ASIP), a physics processing unit (PPU), a digital signal processor (DSP), a field programmable gate array (FPGA), or any other circuit or processor capable of executing the functions described herein. The apparatus 700 may further include a communication circuit 704, a memory 706, a mass storage device 708, an input device 710, and/or a communication link 712 (e.g., a communication bus) over which the one or more components shown in the figure may exchange information.

The communication circuit 704 may be configured to transmit and receive information utilizing one or more communication protocols (e.g., TCP/IP) and one or more communication networks including a local area network (LAN), a wide area network (WAN), the Internet, a wireless data network (e.g., a Wi-Fi, 3G, 4G/LTE, or 5G network).

The memory 706 may include a storage medium (e.g., a non-transitory storage medium) configured to store machine-readable instructions that, when executed, cause the processor 702 to perform one or more of the functions described herein. Examples of the machine-readable medium may include volatile or non-volatile memory including but not limited to semiconductor memory (e.g., electrically programmable read-only memory (EPROM), electrically erasable programmable read-only memory (EEPROM)), flash memory, and/or the like. The mass storage device 708 may include one or more magnetic disks such as one or more internal hard disks, one or more removable disks, one or more magneto-optical disks, one or more CD-ROM or DVD-ROM disks, etc., on which instructions and/or data may be stored to facilitate the operation of the processor 702. The input device 710 may include a keyboard, a mouse, a voice-controlled input device, a touch sensitive input device (e.g., a touch screen), and/or the like for receiving user inputs to the apparatus 700.

It should be noted that the apparatus 700 may operate as a standalone device or may be connected (e.g., networked, or clustered) with other computation devices to perform the functions described herein. And even though only one instance of each component is shown in FIG. 7, a skilled person in the art will understand that the apparatus 700 may include multiple instances of one or more of the components shown in the figure.

While this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and alterations are also possible without departing from the spirit and scope of this disclosure. In addition, unless specifically stated otherwise, discussions utilizing terms such as "analyzing," "determining," "enabling," "identifying," "modifying" or the like, refer to the actions and processes of a computer system, or similar electronic computing device, that manipulates and transforms data represented as physical (e.g., electronic) quantities within the computer system's registers and memories into other data represented as physical quantities within the computer system memories or other such information storage, transmission or display devices.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

What is claimed is:

1. An apparatus, comprising:
one or more processors configured to:
determine a plurality of hypothetical landmarks in one or more medical images of an anatomical structure;
determine a graph representation of the plurality of hypothetical landmarks, wherein the graph representation includes multiple nodes and multiple edges, each of the nodes represents a hypothetical landmark among the plurality of hypothetical landmarks, and each of the edges represents a relationship between a pair of hypothetical landmarks among the plurality of hypothetical landmarks; and
identify, using a graph neural network (GNN), one or more hypothetical landmarks among the plurality of hypothetical landmarks as true landmarks or one or more hypothetical landmarks among the plurality of hypothetical landmarks as false landmarks, wherein the GNN includes:
an encoder network trained to extract respective features from the nodes of the graph representation and the edges of the graph representation;
a core network trained to estimate respective states of the nodes and edges of the graph representation based on the features extracted by the encoder network; and
a decoder network trained to indicate the true landmarks or the false landmarks based on the respective states of the nodes and edges estimated by the core network.

2. The apparatus of claim 1, wherein the core network includes a first core sub-network trained to estate the respective states of the nodes of the graph representation and a second core sub-network trained to estate the respective states of the edges of the graph representation.

3. The apparatus of claim 1, wherein the encoder network includes a node encoder trained to extract the respective features of the nodes of the graph representation and an edge encoder trained to extract the respective features of the edges of the graph representation.

4. The apparatus of claim 1, wherein the one or more processors being configured to determine the plurality of hypothetical landmarks in the one or more medical images of the anatomical structure comprises the one or more processors being configured to extract features from the one or more medical images of the anatomical structure using a landmark detection neural network and determine respective locations of the plurality of hypothetical landmarks in the one or more medical images based on the features extracted by the landmark detection neural network.

5. The apparatus of claim 1, wherein the plurality of hypothetical landmarks includes a first set of hypothetical landmarks detected in a first medical image of the anatomical structure and a second set of hypothetical landmarks detected in a second medical image of the anatomical structure, and wherein the one or more processors being configured to determine the graph representation of the plurality of hypothetical landmarks comprises the one or more processors being configured to:
represent the first set of hypothetical landmarks and the second set of hypothetical landmarks with the nodes of the graph representation;
pair the first set of hypothetical landmarks with the second set of hypothetical marks; and
represent the respective relationships between the paired hypothetical marks with the edges of the graph representation.

6. The apparatus of claim 5, wherein the features extracted by the encoder network for each of the edges of the graph representation indicate a similarity or a dissimilarity between the paired hypothetical landmarks represented by the edge.

7. The apparatus of claim 1, wherein the plurality of hypothetical landmarks includes hypothetical landmarks detected in a single medical image of the anatomical structure, and wherein the one or more processors being configured to determine the graph representation of the plurality of hypothetical landmarks comprises the one or more processors being configured to:
represent the hypothetical landmarks detected in the single medical image with the nodes of the graph representation;

pair a first subset of the hypothetical landmarks detected in the single medical image with a second subset of the hypothetical landmarks detected in the single medical image; and represent the respective relationships between the paired hypothetical marks in the single medical image with the edges of the graph representation.

8. The apparatus of claim 7, wherein the features extracted by the encoder network for each of the edges of the graph representation indicate a geometric constraint between the paired hypothetical landmarks represented by the edge.

9. The apparatus of claim 1, wherein the core network is trained to estimate the respective states of the nodes and edges of the graph representation through an iterative process that includes:
   determining a current state of a node of the graph representation based on a previous state of the node and an average state of one or more edges of the graph representation that are associated with the node; and
   determining a current state of an edge of the graph representation based on a previous state of the edge and respective current states of one or more nodes of the graph representation that are associated with the edge.

10. The apparatus of claim 1, wherein the GNN includes a message passing graph neural network and the plurality of landmarks includes a pair of balloon markers placed inside the anatomical structure or a guide wire placed inside the anatomical structure.

11. A method for landmark detection, comprising:
   determining a plurality of hypothetical landmarks in one or more medical images of an anatomical structure;
   determining a graph representation of the plurality of hypothetical landmarks, wherein the graph representation includes multiple nodes and multiple edges, each of the nodes represents a hypothetical landmark among the plurality of hypothetical landmarks, and each of the edges represents a relationship between a pair of hypothetical landmarks among the plurality of hypothetical landmarks; and
   identifying, using a graph neural network (GNN), one or more hypothetical landmarks among the plurality of hypothetical landmarks as true landmarks or one or more hypothetical landmarks among the plurality of hypothetical landmarks as false landmarks, wherein the GNN includes:
      an encoder network trained to extract respective features from the nodes of the graph representation and the edges of the graph representation;
      a core network trained to estimate respective states of the nodes and edges of the graph representation based on the features extracted by the encoder network; and
      a decoder network trained to indicate the true landmarks or the false landmarks based on the respective states of the nodes and edges estimated by the core network.

12. The method of claim 11, wherein the core network includes a first core sub-network trained to estate the respective states of the nodes of the graph representation and a second core sub-network trained to estate the respective states of the edges of the graph representation.

13. The method of claim 11, wherein the encoder network includes a node encoder trained to extract the respective features of the nodes of the graph representation and an edge encoder trained to extract the respective features of the edges of the graph representation.

14. The method of claim 11, wherein determining the plurality of hypothetical landmarks in the one or more medical images of the anatomical structure comprises extracting features from the one or more medical images of the anatomical structure using a landmark detection neural network and determining respective locations of the plurality of hypothetical landmarks in the one or more medical images based on the features extracted by the landmark detection neural network.

15. The method of claim 11, wherein the plurality of hypothetical landmarks includes a first set of hypothetical landmarks detected in a first medical image of the anatomical structure and a second set of hypothetical landmarks detected in a second medical image of the anatomical structure, and wherein determining the graph representation of the plurality of hypothetical landmarks comprises:
   representing the first set of hypothetical landmarks and the second set of hypothetical landmarks with the nodes of the graph representation;
   pairing the first set of hypothetical landmarks with the second set of hypothetical marks; and
   representing the respective relationships between the paired hypothetical marks with the edges of the graph representation.

16. The method of claim 15, wherein the features extracted by the encoder network for each of the edges of the graph representation indicate a similarity or a dissimilarity between the paired hypothetical landmarks represented by the edge.

17. The method of claim 11, wherein the plurality of hypothetical landmarks includes hypothetical landmarks detected in a single medical image of the anatomical structure, and wherein determining the graph representation of the plurality of hypothetical landmarks comprises:
   representing the hypothetical landmarks detected in the single medical image with the nodes of the graph representation;
   pairing a first subset of the hypothetical landmarks detected in the single medical image with a second subset of the hypothetical landmarks detected in the single medical image; and
   representing the respective relationships between the paired hypothetical marks in the single medical image with the edges of the graph representation.

18. The method of claim 17, wherein the features extracted by the encoder network for each of the edges of the graph representation indicate a geometric constraint between the paired hypothetical landmarks represented by the edge.

19. The method of claim 11, wherein the core network is trained to estimate the respective states of the nodes and edges of the graph representation through an iterative process that includes:
   determining a current state of a node of the graph representation based on a previous state of the node and an average state of one or more edges of the graph representation that are associated with the node; and
   determining a current state of an edge of the graph representation based on a previous state of the edge and respective current states of one or more nodes of the graph representation that are associated with the edge.

20. The method of claim 11, wherein the GNN includes a message passing graph neural network and the plurality of landmarks includes a pair of balloon markers placed inside the anatomical structure or a guide wire placed inside the anatomical structure.

* * * * *